3,258,681
NUCLEAR MAGNETISM WELL LOGGING BY ENHANCEMENT OF PROTON POLARIZATION IN WEAK POLARIZING FIELDS
Robert J. S. Brown, 1217 W. Fern Drive, Fullerton, Calif., and Don D. Thompson, 900 Sea Lane, Corona del Mar, Calif.
Filed May 17, 1963, Ser. No. 281,261
3 Claims. (Cl. 324—.5)

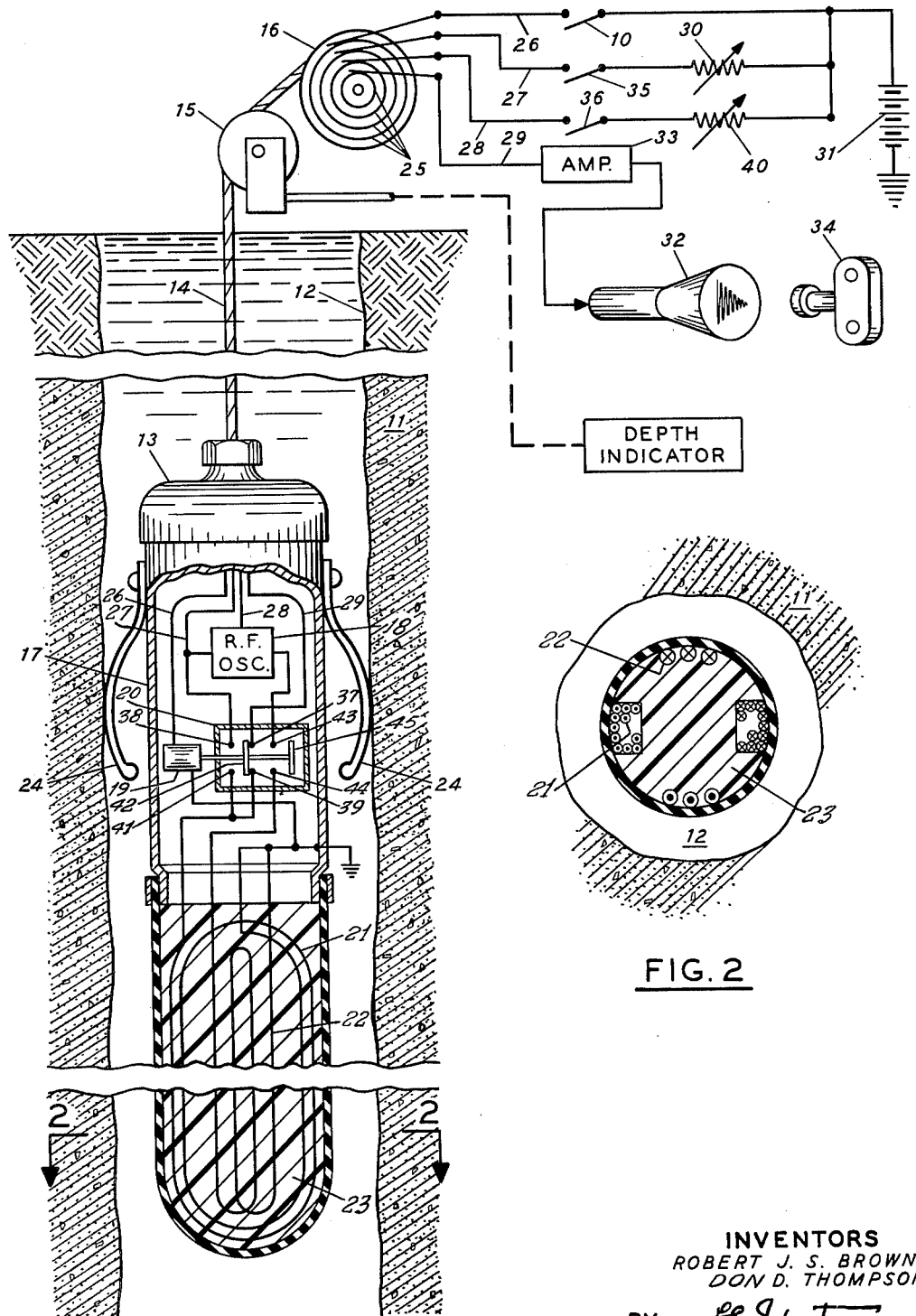

This invention relates to a method and apparatus for logging an earth formation from within a well bore penetrating the formation, and, more particularly, to a nuclear magnetism well logging method for identifying the presence of fluid hydrocarbons within the earth formations penetrated by the well bore.

The discovery of nuclear magnetic resonance and absorption methods made available a new diagnostic technique for sensing the presence of certain atomic nuclei, and particularly hydrogen nuclei. As an outgrowth of this discovery a new well logging technique has been made available to the petroleum industry; it is now possible to determine the presence of hydrogen atoms in an earth formation by measuring signals of nuclear magnetism from those atoms. Even though the hydrogen atoms may be present in either water molecules or hydrocarbon molecules, it is sometimes possible to distinguish between these types of molecules by rather complicated well logging techniques. There are, however, situations and formations where both hydrocarbons and water exist where it is possible to measure signals of nuclear magnetism but not possible to distinguish the molecular origin of these signals.

Methods have been discovered analogous to nuclear magnetic methods that can sense electron resonance and absorption. These discoveries were applied to the art of well logging when it was further discovered that many petroleum crudes display electron resonance from unpaired electrons in their structure. However, the measurement of electron resonance signals from materials within an earth formation is not easily accomplished since the technique requires the irradiation of a formation with high frequency radio waves. It is known that high frequency electromagnetic waves do not penetrate deeply into a formation and, for that reason, it is difficult to establish the conditions that are necessary for the measurement of signals from resonating electrons. Furthermore, other formation materials within the penetrated earth formation contain unpaired electrons and these electrons may also contribute to the electron resonance signals that may be detected by the well logging tool.

More recent discoveries have demonstrated detectable interactions between nuclear magnetic resonance and electron resonance characteristics. Specifically, it has been discovered that an Overhauser Effect may be observed when both the spinning nuclear particles and the spinning free-radical electrons of a molecule are simultaneously brought into their own resonant conditions. In explaining the Overhauser Effect it is reasoned that the induction of energy into the molecule at the rate of spin of the electron causes a transfer of energy between the proton of the nucleus and the electron of the molecule and results in a modification of the polarization of the proton that would have normally been accomplished without the irradiation at the spinning frequency of the electron.

In a copending application of E. H. Poindexter and H. C. Torrey, Serial No. 758,383, filed September 2, 1958, now Patent 3,096,476, for Overhauser Effect Well Logging, a well logging technique has been described for deriving an Overhauser Effect enhancement of nuclear magnetism signals by irradiating a formation with an appropriately adjusted radio frequency signal during at least a portion of a nuclear magnetism well logging operation. The well logging technique described in that application suggests performing a first nuclear magnetism signal measurement operation with the observation of precessional signals from formation protons. Subsequently, a second nuclear magnetism signal measurement operation is performed, at the same location and with the same conditions as the first, with the additional step of irradiating the formation being logged with radio frequency energy appropriately adjusted to resonate with spinning electrons associated with the formation protons that previously contributed to the observed precessional signals. Precessional signals from the formation protons are then observed and compared to the first observed signals. When a difference in the observed signals is detected it is deduced that at least some of the protons that contributed to both of the observed signals must be present in hydrocarbon molecules since only those molecules would have both protons and unpaired electrons. Water does not have unpaired electrons in its molecular structure.

The present invention proposes a single step or continuous Overhauser Effect well logging technique. The object of the present invention is to provide a nuclear magnetism well logging technique that will be responsive only to protons associated in a molecular structure containing both protons and unpaired electrons.

In accordance with the objects of the present invention, the method as proposed herein accomplishes a measurable proton polarization by the simultaneous application of a weak direct current polarizing field and a radio frequency enhancing field of sufficient strength to accomplish the desired penetration into an earth formation. The weak direct current polarizing field is adjusted in strength to be normally insufficient to accomplish measurable polarization of the protons in hydrogen nuclei present within an earth formation being logged. With this D.C. polarizing field alone applied to the formation it would not be possible to establish sufficient proton polarization to permit the measurement of free precessional signals from the polarized protons after the polarizing field had been interrupted. The simultaneous application of the radio frequency resonant field causes an Overhauser Effect enhancement of the proton polarization in those fluids where unpaired electrons are associated with spinning protons. Since it is known that of the two forms of hydrogenous fluids, namely water and oil, present within an earth formation only the hydrocarbon crude oil molecules contain both the spinning proton and the unpaired electron, and since the direct current polarizing field and the radio frequency enhancing field have been selected to accomplish only polarization in those molecules that will display the Overhauser Effect, it may now be determined that if free precessional signals from spinning protons are detected after the polarizing field is interrupted that these signals must be from protons present in hydrocarbon molecules.

The features and further objects of the present invention will be readily apparent to those skilled in the art from the specification and appended drawings illustrating a certain preferred embodiment in which:

FIG. 1 is a schematic illustration of a nuclear magnetism well logging tool including control circuits for the energization of a polarizing field coil and an enhancing field coil and for connecting the well logging tool to surface equipment for the observation of nuclear magnetism signals.

FIG. 2 is a sectional view through the coil portion of the well logging tool taken generally along the lines 2—2 of FIG. 1.

In FIG. 1 an earth formation 11 penetrated by a well bore 12 is shown in section. A logging sonde 13 is supported within the well bore upon a cable 14 passing over a reel 15 and onto a cable drum 16. The logging sonde 13 comprises a nonmagnetic, and preferably nonmetallic, housing 17 enclosing a radio frequency (RF) oscillator 18 and switching circuits including a solenoid 19 and contacts enclosed within a vacuum chamber 20. The contactors operated by solenoid 19 within the chamber 20 are spring biased to the position shown in FIG. 1 when the solenoid is unenergized. Suspended below the sonde 13 is a polarizing coil 21 and an irradiating coil 22 embedded or encased within a material 23 having a low dielectric constant, as for instance Styrofoam or epoxy resin, so as to be light in weight and to provide an interior portion of low dielectric loss. A suitable plurality of resilient centering fingers 24 are provided on the lagging sonde 13 to maintain the tool in the center of the well bore as the logging operations are performed.

Cable 14 not only supports the sonde 13 but also provides electrical connections between the apparatus within the sonde and the controls at the earth's surface. Slip rings 25 are provided on reel 16 to establish connection to the conductors of the cable 14.

The cable 14 comprises a plurality of conductors 26, 27, 28 and 29 connected to appropriate circuits for energization of the logging sonde to accomplish the polarization, enhancement, and signal detection functions of the sonde. In its most simplified form the components at the earth's surface comprise a power source 31 and a signal display means 32 with associated amplifying means 33 and recording means 34. The signal detecting components are herein preferably illustrated as an oscilloscope 32 and a recording camera 34.

The conductors within the sonde are identified by the same numerals as used for the conductors at the earth's surface. Conductor 26 is connected through a switch 10 to the battery 31 at the surface and to one pole of the solenoid 19 within the sonde. The other pole of the solenoid 19 is connected to ground. Conductor 27 is connected through a switch 35 to the battery 31 at the earth's surface and to contact 38 within the vacuum chamber 20. Conductor 28 is connected through a switch 36 to the battery 31 at the earth's surface and to a control input of the RF oscillator 18 within the sonde. Conductor 29 is connected through amplifier 33 to the oscilloscope 32 at the earth's surface and to a contact 37 within the vacuum chamber 20 in the sonde. In mating relationship with the contacts 37 and 38 are contacts 39 and 41 respectively within the chamber 20 and bridging these mating contacts is a movable contactor 42 operated by the solenoid 19. Contacts 39 and 41 are connected together and to one end of the polarizing coil 21; the other end of the coil is connected to a grounding terminal within the sonde. Another pair of mating contacts 43 and 44 are included within the chamber 20 with a bridging contactor 45 also operated by the solenoid 19 with the contactor 42. The RF oscillator 18 is connected to contact 43 and contact 44 is connected to one end of the enhancing coil 22. The other end of the enhancing coil is connected to the grounding terminal within the sonde.

A depth indicator at the earth's surface is mechanically connected to the cable reel 15 to provide an indication of the depth of the sonde within the well bore 12.

An energization control circuit for interconnecting a power source and logging sonde in substantially the same controlled manner is illustrated in the aforementioned copending application No. 758,383. The control system herein illustrated is intended to include only the minimum essentials that would be necessary to establish the magnetic fields necessary for performing the method of the present invention.

With the foregoing description of the apparatus as illustrated and the foregoing description of the enhancement accomplished through the use of a radio frequency electromagnetic enhancing field, the operation of the logging sonde of the present invention should be readily apparent. The power source 31 is connected to the polarizing coil 21 through contacts 38 and 41 upon closing switch 35 after energization of the solenoid 19 through switch 10. The energization of the solenoid causes contactor 42 to be moved into bridging engagement with contacts 38 and 42 and contactor 45 to be moved into bridging engagement with contacts 43 and 44. In the energized position the contactor will provide a circuit for current to flow through coil 21 and a polarizing field will be established in accordance with the adjustment of the current by adjustable resistor 30. Upon closure of switch 36 the RF oscillator 18 will be energized to supply radio frequency power to the coil 22 through contacts 43 and 44 and contactor 45. The strength of the radio frequency field may be controlled by adjustment of rheostat 40 at the earth's surface. Upon opening switches 10 and 35, preferably simultaneously with the opening of switch 36, the solenoid 19 will be deenergized and contactor 42 will be returned to engagement with contacts 37 and 39. In that position the coil 21 will be connected through contactor 42 to conductor 29 to supply detected precessional signals to the amplifier 33 and oscilloscope 32 at the earth's surface. The detected signals will generally appear as a damped precessional signal on the face of the oscilloscope 32 and a record of these signals will be recorded by the camera 34.

As illustrated in FIG. 2 the coils 21 and 22 are arranged to be perpendicular to each other so as to avoid any inductive coupling therebetween. Because only a weak polarizing field will be generated, the current through the coil 21 will be relatively low. The resistance of the polarizing coil will therefore not be a serious problem and the coil can be designed more for its signal receiving characteristics than for its polarizing current carrying characteristics. The coil may therefore be designed to provide a high Q for receiving the precessional signals. Furthermore, since only small currents will be flowing through the polarizing coil, the problem of interrupting these currents will be minimal. The RF coils being at right angles to the polarizing coil will not be inductively coupled to the polarizing coils and may comprise a few turns of a copper tubing or bar stock having appropriate characteristics for the RF current.

The operation of the logging sonde to accomplish the Overhauser enhancement nuclear magnetism signal measurements will now be described. Switch 10 is closed to cause operation of the solenoid 19. Switch 35 may then be closed to supply an adjusted polarizing current to the polarizing coil 21. The current will be adjusted to provide the minimal amount of penetration into the formation 11. During the existence of the polarizing field generated by the energized coil 21, switch 36 will be closed to supply an adjusted RF current through coil 22 to irradiate the formation 11 with a controlled electromagnetic field. With properly adjusted relationships between the D.C. polarizing field and the radio frequency irradiating field, the desired Overhauser enhancement of the nuclear polarization will be accomplished. After a prescribed polarization program, the switches 35 and 36 will be preferably simultaneously opened and the coil 21 will be connected to the signal detecting components at the earth's surface to display the detected nuclear magnetism precessional signals. The signals may be observed almost instantaneously after solenoid 19 has been deenergized and after bridging contactor 42 has connected coil 21 to the surface components through contacts 39 and 37 in that a minimal amount of current is employed in establishing the polarizing field and this may be easily dissipated within the vacuum chamber 20.

When an earth formation is logged in accordance with the present invention it may be deduced that if precessional signals are detected after a programmed energization of the logging sonde, that it, with the weak D.C. polarizing field and the controlled radio frequency irradiation, these signals must be due to the presence of protons within crude oil molecules. The polarizing field will have been adjusted to a strength such that it alone will not establish a measurable polarization of the protons within the penetrated earth formation. A current through coil 21 adequate to produce a magnetic field of about 5 gauss at the edge of the borehole is appropriate. The RF current through coil 22 should be adjusted to produce a field about 3 to 5 gauss in strength and between 2 to 30 megacycles in frequency. About 7 megacycles is preferred. The well logging method of the present invention when performed with the suggested field strengths and frequencies will provide an unambiguous indication of the presence of petroleum crude within an earth formation.

The orientation of the polarizing coil in azimuth is not critical, since the pattern of the magnetic field generated by the coil will establish magnetic flux lines that will be effectively perpendicular to the earth's magnetic field for at least half of the volume of earth formation surrounding the well bore in the vicinity of the coil.

While a certain preferred embodiment of the present invention has been herein specifically disclosed in the form of an apparatus and method of operation, it is intended that the invention should not be limited to the apparatus as shown but should be given its broadest possible interpretation within the terms of the following claims.

What is claimed is:

1. A nuclear magnetism well logging method for deriving precessional signals from protons of hydrocarbon molecules in an earth formation from within a well bore penetrating said earth formation comprising the steps of:
    (a) generating for a controllable period of time a weak polarizing magnetic field having at least a component thereof perpendicular to the earth's magnetic field, said weak magnetic field being inadequate alone to establish measurable polarization of protons of water molecules within said earth formation,
    (b) simultaneously during at least a portion of the time said weak polarizing field is being generated, irradiating said earth formation with a radio frequency radiation that is preferentially absorbed by electrons in free radicals of said hydrocarbon molecules in said weak polarizing field,
    (c) interrupting both said weak polarizing magnetic field and said irradiating magnetic field,
    (d) and detecting precession signals induced by protons of said hydrocarbon molecules precessing in the earth's magnetic field.

2. A nuclear magnetism well logging method for deriving precessional signals from protons of hydrocarbon molecules in an earth formation from within a well bore penetrating said earth formation comprising the steps of:
    (a) generating for a controllable period of time a weak polarizing magnetic field having at least a component thereof perpendicular to the earth's magnetic field, said weak magnetic field being inadequate alone to establish measurable polarization of protons of water molecules within said earth formation,
    (b) simultaneously during at least a portion of the time said weak polarizing field is being generated, irradiating said earth formation with a radio frequency radiation that is preferentially absorbed by electrons in free radicals of said hydrocarbon molecules in said weak polarizing field to enhance polarization of protons of hydrocarbon molecules within said earth formation, said irradiating field being aligned substantially normal to said weak polarizing magnetic field,
    (c) interrupting both said weak polarizing magnetic field and said irradiating magnetic field to initiate precession of protons polarized by said polarizing and enhancing fields,
    (d) and detecting signals induced by said precessing protons of said hydrocarbon molecules precessing in the earth's magnetic field.

3. A nuclear magnetism well logging method for identifying the presence of hydrocarbon molecules in an earth formation from within a well bore penetrating said earth formation comprising the steps of:
    (a) establishing within said earth formation a weak polarizing magnetic field having at least a component thereof perpendicular to the earth's magnetic field, said polarizing field being of the order of about 5 gauss at the interface between said well bore and said earth formation,
    (b) simultaneously establishing a radio frequency irradiation within said well bore and earth formation, said irradiation frequency being within the range of 2 to 30 megacycles,
    (c) interrupting said polarizing magnetic field and said irradiating magnetic field to initiate precession of polarized protons in the earth's magnetic field,
    (d) and detecting signals induced by said precessing protons of said hydrocarbon molecules in the earth's magnetic field.

References Cited by the Examiner

UNITED STATES PATENTS

| | | | |
|---|---|---|---|
| 2,999,204 | 9/1961 | Jones et al. | 324—0.5 |
| 3,096,476 | 7/1963 | Poindexter et al. | 324—0.5 |

FOREIGN PATENTS

| | | |
|---|---|---|
| 1,141,373 | 3/1957 | France. |
| 1,221,637 | 1/1960 | France. |

CHESTER L. JUSTUS, *Primary Examiner.*

MAYNARD R. WILBUR, *Assistant Examiner.*